(12) United States Patent
Hsu

(10) Patent No.: US 6,987,764 B2
(45) Date of Patent: Jan. 17, 2006

(54) METHOD AND APPARATUS FOR SELECTING A PACKET DATA SERVING NODE FOR MULTI-CAST/BROADCAST SERVICES

(75) Inventor: Raymond T. Hsu, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 309 days.

(21) Appl. No.: 10/011,954

(22) Filed: Nov. 5, 2001

(65) Prior Publication Data
US 2003/0086423 A1 May 8, 2003

(51) Int. Cl.
*H04L 12/28* (2006.01)
*H04L 12/56* (2006.01)

(52) U.S. Cl. ............... 370/390; 370/392; 370/331; 370/400

(58) Field of Classification Search ............ 370/432, 370/338, 351, 352–356, 390, 392, 331, 400, 370/252, 256; 455/502–503
See application file for complete search history.

(56) References Cited

U.S. PATENT DOCUMENTS

| 6,091,724 A | * | 7/2000 | Chandra et al. | 370/390 |
| 6,834,050 B1 | * | 12/2004 | Madour et al. | 370/392 |
| 2003/0073453 A1 | * | 4/2003 | Basilier | 455/503 |

FOREIGN PATENT DOCUMENTS

| EP | 1071296 A1 | 1/2001 |
| WO | 00/57601 | 9/2000 |
| WO | 01/78322 A2 | 10/2001 |
| WO | WO 01/78322 A2 | * 10/2001 |
| WO | 02/09450 A2 | 1/2002 |

OTHER PUBLICATIONS

J.J. Garcia–Luna–Aceves et al. "A Multicast Routing Protocol for Ad–Hoc Networks," Proceedings IEEE Infocom 99. The Conference on Computer Communications, New York, NY, Mar. 21–25, 1999, vol. 2, pp. 784–792.

J. Reeve et al. "Learning algorithms for multicast routing," IEEE Proceedings: Communications, Institution of Electrcial Engineers, GB, vol. 146, No. 2, Apr. 16, 1999, pp. 89–94.

* cited by examiner

*Primary Examiner*—Wellington Chin
*Assistant Examiner*—Chuong Ho
(74) *Attorney, Agent, or Firm*—Phillip R. Wadsworth; Thien T. Nguyen

(57) ABSTRACT

Method and apparatus for selecting a Packet Data Service Node (PDSN) for a communication in a wireless transmission system supporting broadcast transmissions. The packet control function node determines a number of communicable PDSNs and assigns each a unique identifier. The PCF then selects one of the communicable PDSNs based on the multi-cast address of a given communication. One embodiment performs a modulo operation on a function of the multi-cast address and the number of communicable PDSNs, wherein the result of the modulo operation corresponds to a unique identifier.

16 Claims, 7 Drawing Sheets

METHOD AND APPARATUS FOR SELECTING A PACKET DATA SERVING NODE FOR MULTI-CAST/BROADCAST SERVICES

REFERENCE TO CO-PENDING APPLICATIONS FOR PATENT

The present invention is related to the following applications for patent in the U.S. Patent & Trademark Office:

"Method and Apparatus for Data Packet Transport in a Wireless Communication System Using an Internet Protocol" by Nikolai Leung et al., having U.S. application Ser. No. 09/970,487, filed Oct. 3, 2001; and "Method and Apparatus for Data Transport in a Wireless Communication System" by Raymond Hsu, having U.S. application Ser. No. 09/933,977, filed Aug. 20, 2001;

both applications for patent are assigned to the assignee hereof and are expressly incorporated by reference herein.

BACKGROUND

1. Field

The present invention relates to wireless communication systems generally and specifically, to methods and apparatus for message transmission in a wireless communication system.

2. Background

There is an increasing demand for packetized data services over wireless communication systems. As traditional wireless communication systems are designed for voice communications, the extension to support data services introduces many challenges. The conservation of bandwidth is the overwhelming concern for most designers. In uni-direction transmissions, such as broadcast transmissions, a single broadcast content is provided to multiple users. The users are identified by a unique identifier, which is then included in addressing information. In such a system, multiple infrastructure elements may be required to duplicate the broadcast packets so as to identify each of the multiple intended receivers. The duplication of transmission signals uses up valuable bandwidth thus reducing the efficiency of the communication system, and increases the processing requirements of intermediate infrastructure elements. For a broadcast service in particular, the number of target recipients may be prohibitively large, thus creating problems of resource allocation and loss of available bandwidth.

There is a need, therefore, for an efficient and accurate method of transmitting data to multiple recipients in a wireless communication system. Further, there is a need for a method of routing broadcast data to multiple users, wherein each user is uniquely identified as a target recipient.

SUMMARY

Embodiments disclosed herein address the above stated needs by providing a method for selecting a Packet Data Service Node (PDSN) based on the multi-cast address of a given communication. One embodiment performs a modulo operation on the multi-cast address and number of PDSNs reachable by or communicable with a Packet Control Function (PCF) node. The result of the modulo operation corresponds to one of the number of PDSNs.

In one aspect, in a wireless communication system supporting broadcast transmissions, the system having a protocol control function node and a plurality of packet data service nodes, a method for setting up transmission paths includes determining a first number of the plurality of packet data service nodes communicable with the protocol control function node, and determining a first packet data service node for a first communication as a function of the first number.

In another aspect, in a wireless communication system supporting broadcast transmissions, the system having a protocol control function node and a plurality of packet data service nodes, a method for setting up transmission paths includes determining a multi-cast address of a first communication; and determining a first packet data service node for the first communication as a function of the multi-cast address.

DETAILED DESCRIPTION

Figure 1:
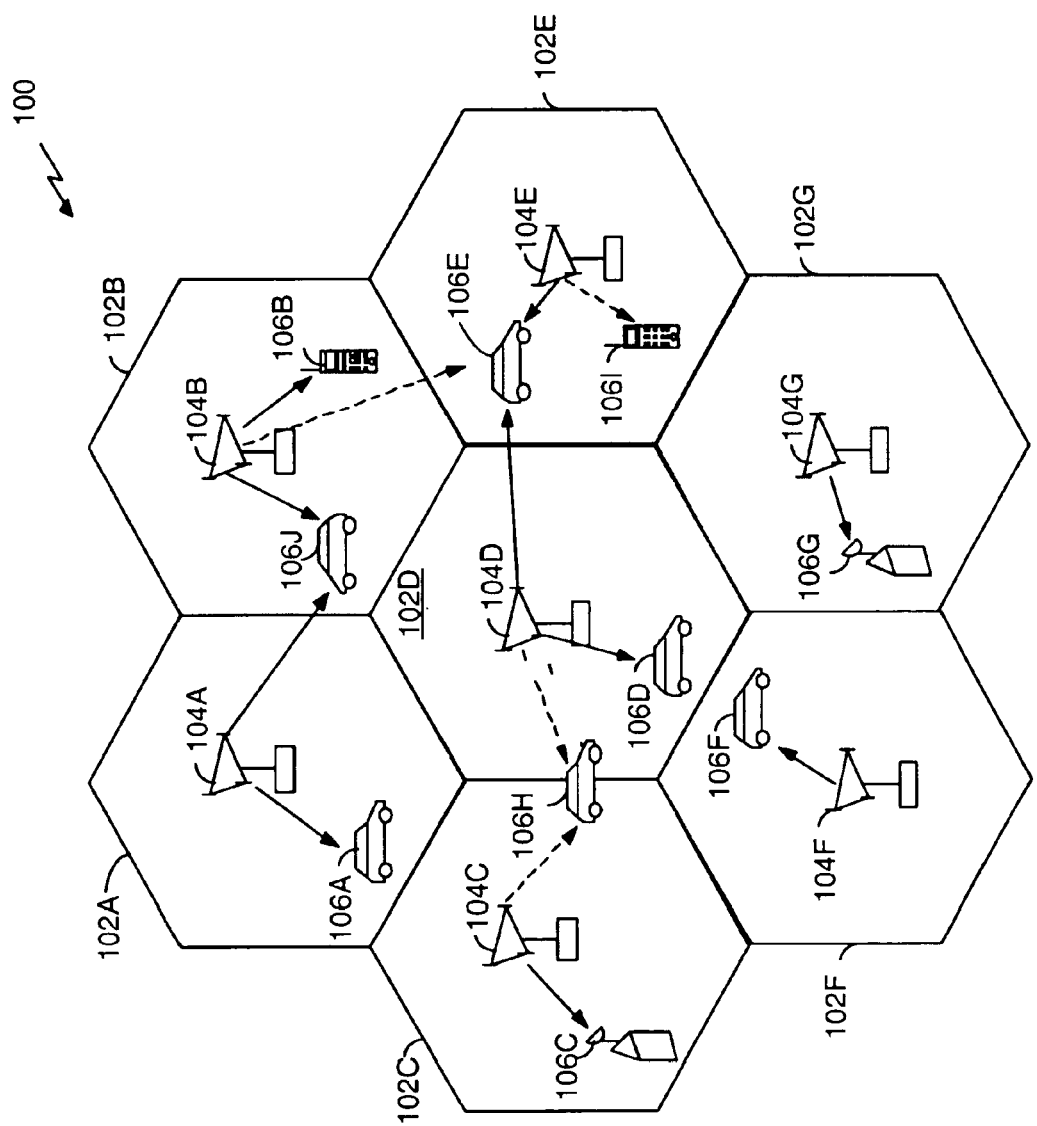
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments.

The efficient use of available bandwidth impacts the performance and breadth of the system. Toward that end, various techniques have been applied to reduce the size of overhead information transmitted along with the data or content information. For example, in a digital transmission, data is transmitted in frames. A frame of information typically includes header information, data payload information, and a tail portion. The frames may be part of a packet of data, part of a data message, or continuous frames in a stream of information, such as audio and/or video streams. Attached to each frame of data (and each packet or message) is a header containing processing information that allows the receiver to understand the information contained in the frame(s). This header information is considered overhead, i.e., processing information transmitted along with information content. The information content is referred to as the payload.

The data frames are transmitted throughout the communication system via various infrastructure elements. In a conventional system, the transmission of information to multiple users requires the duplication of the information at a central packet data control point, such as a Packet Data Service Node (PDSN). The duplication increases the processing requirements of the PDSN and wastes valuable bandwidth. For example, expansion of a given system may require routers and trunks proximate a PDSN be sized sufficiently to handle the duplicated traffic. The PDSN transmits the multiple copies to the base stations, which forward the information to each user. The conventional approach is particularly disadvantageous in a uni-directional broadcast service, wherein many users are receiving the broadcast transmission. The PDSN in this case must make a great number of copies, apply a specific address to each copy and transmit the copies individually.

The PDSN is typically required to provide additional header information identifying each target recipient. For a broadcast service, the number of target recipients may be prohibitively large, thus creating problems of resource allocation and loss of available bandwidth.

An exemplary embodiment of a wireless communication system employs a method of data transport that reduces the bandwidth used by the infrastructure elements while satisfying the accuracy and transmission requirements of the system. In the exemplary embodiment, duplication is performed at the BS or Packet Control Function (PCF) node, freeing the PDSN or central packet data router, to send the message with a multi-cast header to each BS or PCF involved in the broadcast. For example, a message may process through a MC tree to a PCF, wherein the PCF duplicates the message for each BSC and then transmits each message via a distinct Uni-Cast (UC) connection, i.e., connection or secure tunnel created between the PCF and a specific BSC. Note that a UC connection may be considered a point-to-point connection. The exemplary embodiment supports a uni-directional broadcast service. The broadcast service provides video and/or audio streams to multiple users. Subscribers to the broadcast service "tune in" to a designated channel to access the broadcast transmission. As the bandwidth requirement for high speed transmission of video broadcasts is great, it is desirable to reduce the amount of duplication and transmission of duplicate packets over the hops in the network.

The following discussion develops the exemplary embodiment by first presenting a spread-spectrum wireless communication system generally. Next, the broadcast service is introduced; wherein the service is referred to as High Speed Broadcast Service (HSBS), and the discussion includes channel assignments of the exemplary embodiment. A subscription model is then presented including options for paid subscriptions, free subscriptions, and hybrid subscription plans, similar to those currently available for television transmissions. The specifics of accessing the broadcast service are then detailed, presenting the use of a service option to define the specifics of a given transmission. The message flow in the broadcast system is discussed with respect to the topology of the system, i.e., infrastructure elements. Finally, the header compression used in the exemplary embodiment is discussed Note that the exemplary embodiment is provided as an exemplar throughout this discussion; however, alternate embodiments may incorporate various aspects without departing from the scope of the present invention. Specifically, the present invention is applicable to a data processing system, a wireless communication system; a uni-directional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3 rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3 rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma200 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a CDMA type system having HDR service.

High Speed Broadcast System (HSBS)

Figure 2:
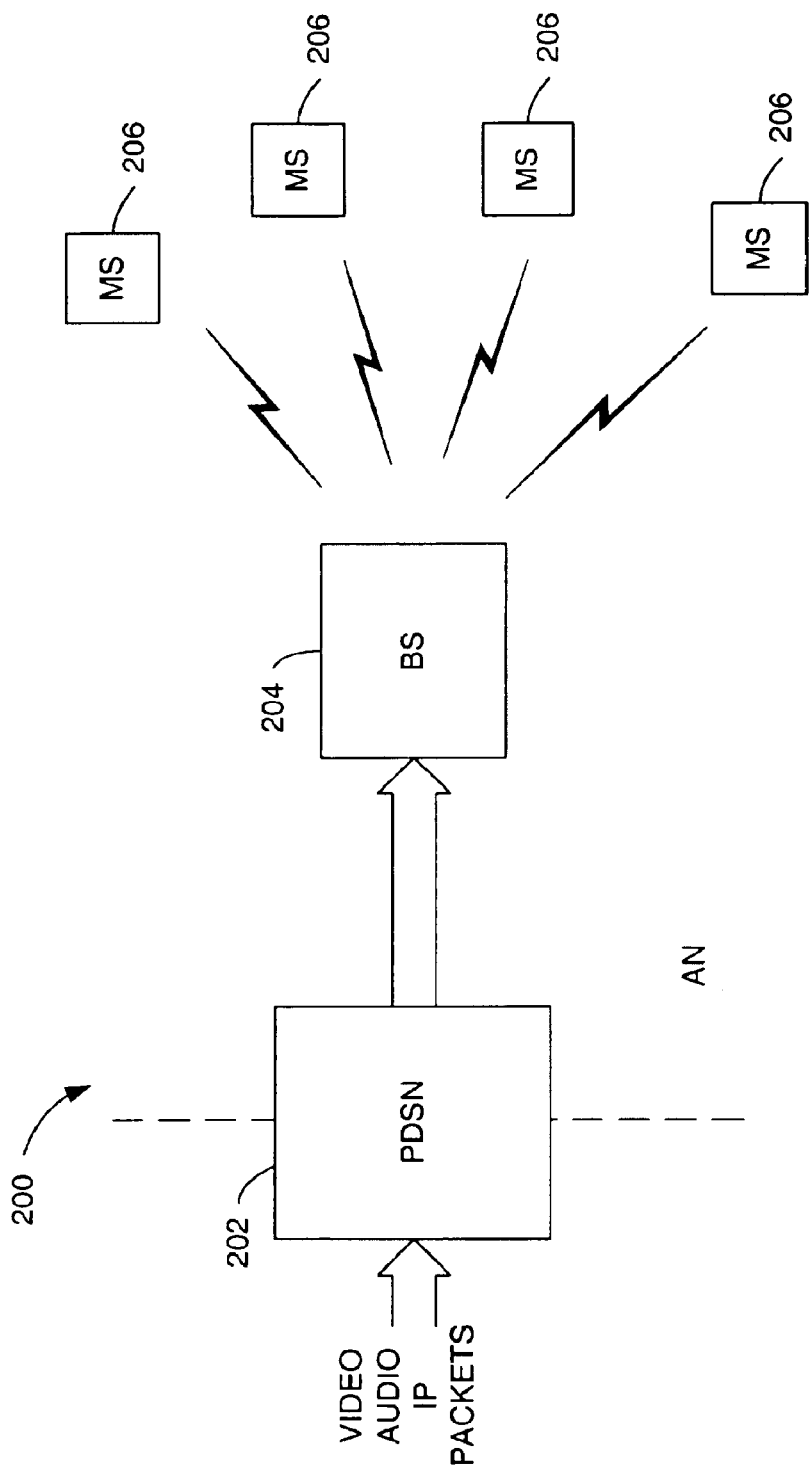
FIG. 2 is a block diagram of the communication system supporting broadcast transmissions.

A wireless communication system 200 is illustrated in FIG. 2, wherein video and audio information is provided to Packet Data Service Node (PDSN) 202. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200.

In a given sector, there are several ways in which the HSBS broadcast service may be deployed. The factors involved in designing a system include, but are not limited to, the number of HSBS sessions supported, the number of frequency assignments, and the number of broadcast physical channels supported.

The HSBS is a stream of information provided over an air interface in a wireless communication system. The "HSBS channel" to refer to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code that carries broadcast traffic. The Broadcast Channel, BCH, corresponds to a single Code Division Multiplex (CDM) channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a Content Server (CS) advertises the availability of such high-speed broadcast service to the system users. Any user desiring to receive the HSBS service may subscribe with the CS. The subscriber is then able to scan the broadcast service schedule in a variety of ways that may be provided by the CS. For example, the broadcast schedule may be communicated through advertisements, Short Management System (SMS) messages, Wireless Application Protocol (WAP), and/or some other means generally consistent with and convenient for mobile wireless communications. Mobile users are referred to as Mobile Stations (MSs). Base Stations (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS reads the overhead messages and learns the appropriate configurations. The MS then tunes to the frequency containing the HSBS channel, and receives the broadcast service content.

The channel structure of the exemplary embodiment is consistent with the cdma2000 standard, wherein the Forward Supplemental Channel (F-SCH) supports data transmissions. One embodiment bundles a large number of the Forward Fundamental Channels (F-FCHs) or the Forward Dedicated Control Channels (F-DCCHs) to achieve the higher data rate requirements of data services. The exemplary embodiment utilizes an F-SCH as the basis for the F-BSCH supporting a payload of 64 kbps (excluding RTP overhead). The F-BSCH may also be modified to support other payload rates, for example, by subdividing the 64-kbps payload rate into sub-streams of lower rates.

One embodiment also supports group calls in several different ways. For example, by using existing unicast channels, i.e., one forward link channel per MS with no sharing, of F-FCH (or the F-DCCH) on both forward and reverse links. In another example, the F-SCH (shared by group members in the same sector) and the F-DCCH (no frames but the Forward Power Control Subchannel most of the time) on the forward link and the R-DCCH on the reverse link are applied. In still another example, the high-rate F-BSCH on the forward link and the Access Channel (or the Enhanced Access Channel/Reverse Common Control Channel combination) on the reverse link is utilized.

Having a high data rate, the Forward Broadcast Supplemental Channel (F-BSCH) of the exemplary embodiment may use a very large portion of a base station's forward link power to provide adequate coverage. The physical layer design of HSBC is thus focused on efficiency improvements in a broadcast environment.

To provide adequate support for video services, system design considers the required base station power for various ways to transmit the channel as well as the corresponding video quality. One aspect of the design is a subjective trade-off between the perceived video quality at the edge of coverage and that close to the cell site. As the payload rate is reduced, the effective error correcting code rate is increased, a given level of base station transmit power would provide better coverage at the edge of the cell. For mobile stations located closer to the base stations, the reception of the channel remains error-free and the video quality would be lowered due to the lowered source rate. This same trade-off also applies to other, non-video applications that the F-BSCH can support. Lowering the payload rate supported by the channel increases the coverage at the expense of decreased download speed for these applications. The balancing the relative importance between video quality and data throughput versus coverage is objective. The configuration chosen seeks an application-specific optimized configuration, and a good compromise among all possibilities.

The payload rate for the F-BSCH is an important design parameter. The following assumptions may be used in designing a system supporting broadcast transmissions according to the exemplary embodiment: (1) the target payload rate is 64 kbps, which provides an acceptable video quality; (2) for streaming video services, the payload rate is assumed to include the 12 8-bit bytes per packet overhead of the RTP packets; (3) the average overhead for all layers between RTP and the physical layer is approximately 64, 8-bit bytes per packet plus 8 bits per F-SCH frame overhead used by the MUXPDU header.

In the exemplary embodiment, for non-video broadcast services, the maximum rate supported is 64 kbps. However, many other possible payload rates below 64 kbps are also achievable.

Subscription Models

There are several possible subscription/revenue models for HSBS service, including free access, controlled access, and partially controlled access. For free access, no subscription is needed by the user to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

HSBS Service Option

Figure 3:
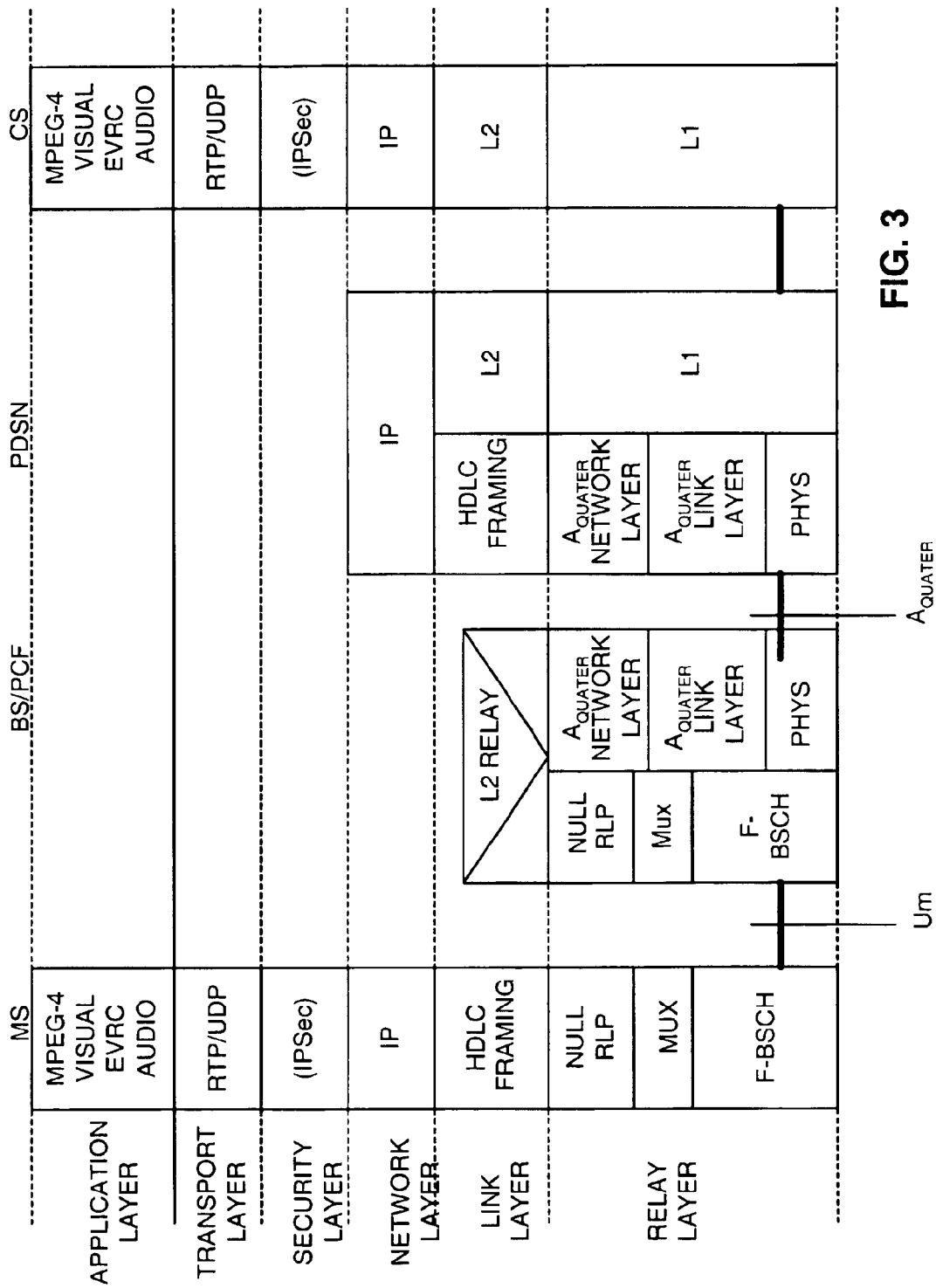
FIG. 3 is a model of the protocol stack corresponding to a broadcast service option in a wireless communication system.
Figure 4:
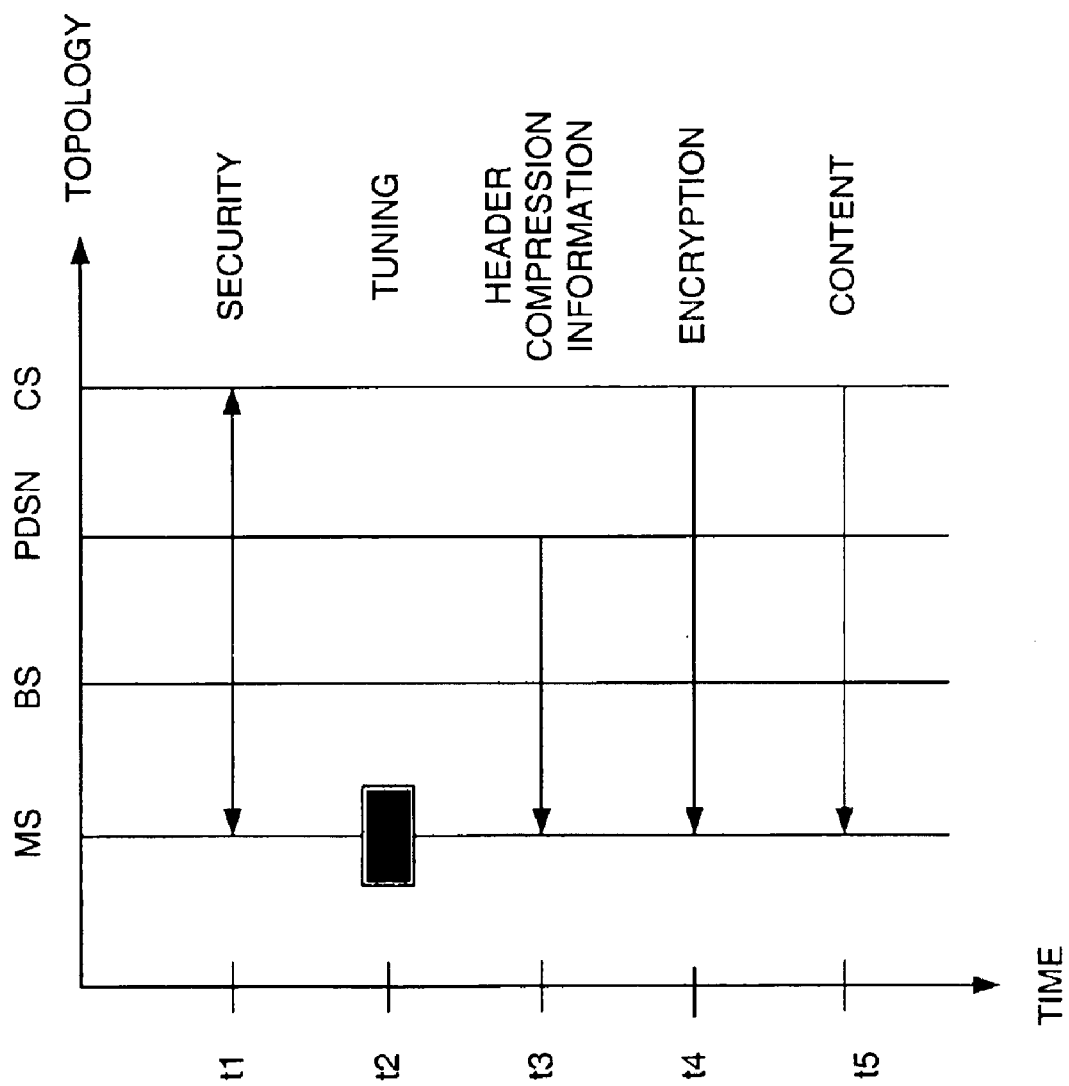
FIG. 4 is a flow diagram for a message flow for broadcast service in a wireless communication system topology.

The HSBS service option is defined by: (1) a protocol stack; (2) options in the protocol stack; and (3) procedures for setting up and synchronizing the service. The protocol stack according to the exemplary embodiment is illustrated in FIGS. 3 and 4. As illustrated in FIG. 3, the protocol stack is specific to the infrastructure element, i.e., MS, BS, PDSN and CS in the exemplary embodiment.

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port. The security layer of the MS is specified by the protocol, wherein security parameters are provided via out-of-band channels when the security is initially associated with the CS. The network layer specifies the IP header compression parameters. According to one embodiment, at the link layer, data packets are compressed and then an appropriate framing protocol is applied to the compressed data.

Message Flow

FIG. 4 illustrates the call flow of one embodiment for a given system topology. The system includes a MS, BS, PDSN and CS, as listed on the horizontal axis. The vertical axis represents the time. The user or MS is a subscriber to the HSBS service. At time t1 the MS and CS negotiate the subscription security for the broadcast service. Negotiation involves exchange and maintenance of encryption keys, etc., used for receiving the broadcast content on the broadcast channel. The user establishes a security association with the CS on reception of the encryption information. The encryption information may include a Broadcast Access Key (BAK) or a key combination, etc., from the CS. According to one embodiment, the CS provides the encryption information over a dedicated channel during a packet data session, such as via PPP, WAP, or other out-of-band methods.

At time t2 the MS tunes into the broadcast channel and starts to receive packets. At this point in time, the MS is unable to process the received packets because the IP/ESP header is compressed via ROHC, and the MS's decompressor has not been initialized. The PDSN provides header compression information (detailed hereinbelow) at time t3. From the ROHC packet header, the MS detects and obtains a ROHC Initialization & Refresh (IR) packet sent periodically from the PDSN to the broadcast channel. The ROHC IR packet is used to initialize the state of decompressor in the MS, allowing it to decompress the IP/ESP header of the received packets. The MS is then able to process the IP/ESP header of the received packets, however, the MS requires further information to process the ESP payload as the payload is encrypted with a Short-term Key (SK) at the CS. The SK acts in coordination with the BAK, wherein the SK is decrypted at the receiver using the BAK. The CS provides further encryption information, such as updated key information or a current SK at time t4. Note that the CS provides this information periodically to the MS to ensure the ongoing security of the broadcast. At time t5 the MS receives the broadcast content from the CS. Note that alternate embodiments may incorporate alternate compression and decompression methods that provide efficient transmission of the header information. Additionally, alternate embodiments may implement a variety of security schemes to protect the broadcast content. Still alternate embodiments may provide a non-secure broadcast service. The MS uses the encryption information, such as the SK, to decrypt and display broadcast content.

Access Network

Figure 5:
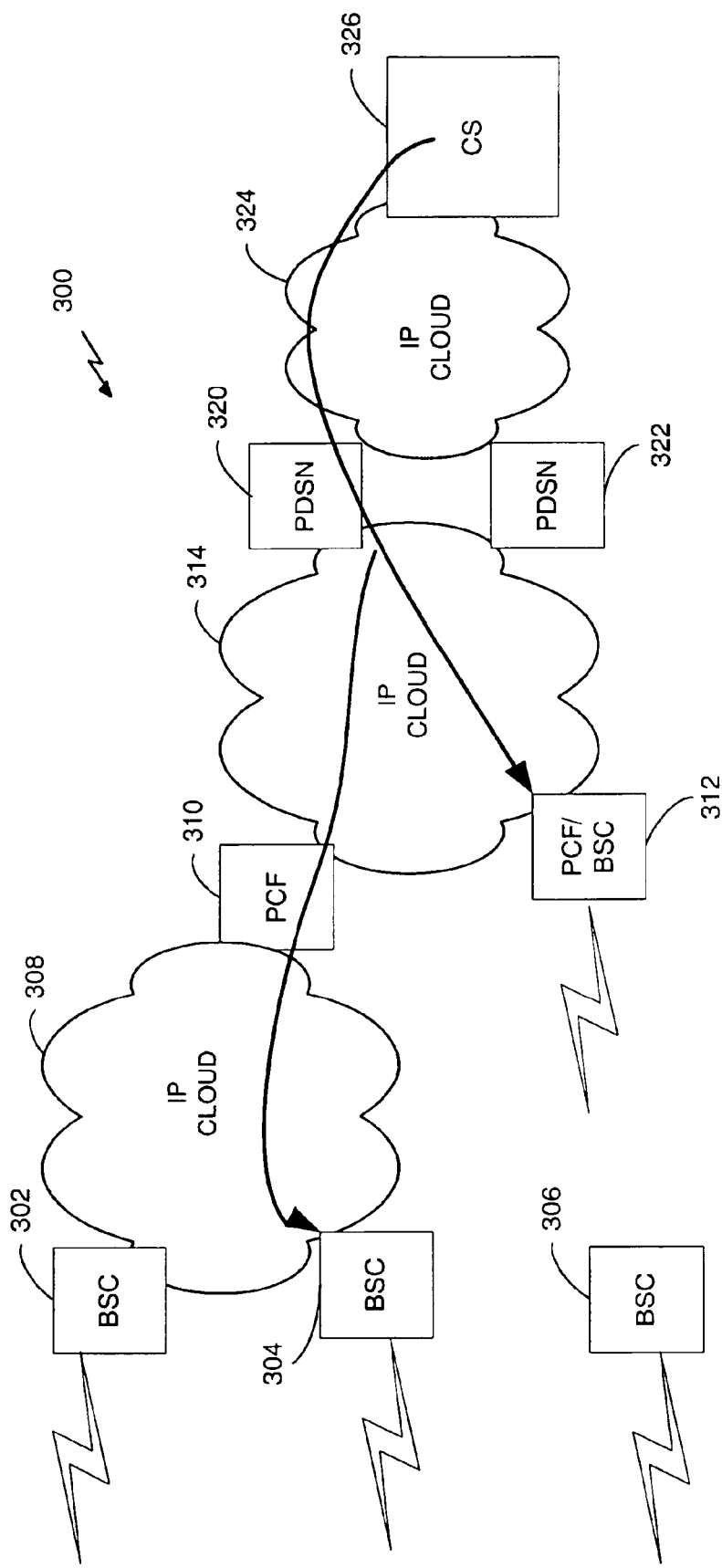
FIG. 5 is a functional diagram of a wireless communication system supporting broadcast transmission with multi-cast Internet Protocol transmission of broadcast content.

A general access network topology for a system 300 is illustrated in FIG. 5 having a CS 326, two PDSN 320, 322, a PCF 310, a co-located PCF and BSC 312, and three BSC 302, 304, 306. The CS 326 is coupled to the PDSN 320, 322 by way of an IP cloud 324. The IP cloud 324, as well as IP clouds 314 and 308 are basically a configuration of interconnected routers that form an IP path from the CS to various recipients of data from the CS. In the IP cloud 308 a virtual tunnel, referred to as an A8 tunnel, is formed for transmitting information from the PCF 310 to the BSC 302 and the BSC 304. The tunnel may be a GRE tunnel. A protocol referred to as A9 is used for establishing the A8 tunnel. The IP cloud 308 may be labeled an A8/A9 cloud. In the IP cloud 314 a virtual tunnel, referred to as an A10 tunnel, is formed for transmitting information from the PDSN 320 to each of the PCF 310 and the PCF/BSC 312. Note that an A10 tunnel is formed from PDSN 320 to PCF 310 and a second A10 tunnel is formed from PDSN 320 to PCF/BSC 312. The tunnels may be GRE tunnels. A protocol referred to as A11 is used for establishing the A10 tunnel. The IP cloud 314 may be labeled an A10/A11 cloud. One embodiment is consistent with that specified in the cdma2000 and HDR standards, described hereinabove. The Access Network (AN) is defined as the elements and connections from the PDSN to the end user, e.g., MS.

According to one embodiment, the broadcast CS 326 sends IP packets containing encrypted broadcast content to a multi-cast group identified by a class-D multi-cast IP address. This address is used in the destination address field of the IP packets. A given PDSN 320 participates in multi-cast routing of these packets. After compression, the PDSN 320 places each packet in an HDLC frame for transmission. The HDLC frame is encapsulated by a Generic Routing Encapsulation (GRE) packet. Note that the GRE encapsulation forms the A10 tunnel described hereinabove. The key field of the GRE packet header uses a special value to indicate a broadcast bearer connection. The GRE packet is appended with the 20-byte IP packet header having a source address field identifying the IP address of the PDSN 320, and destination address field uses a class-D multi-cast IP address. The multi-cast IP address is the same as the one used by the original IP packet from CS 326. The packets delivered in the broadcast connection are provided in sequence; in one embodiment the GRE sequencing feature is enabled. Duplication of the IP multi-cast packets is done in multi-cast-capable routers. Note that according to an alternate embodiment, the IP cloud 314 implements point-to-point, or unicast, tunnels to individual recipient PCF(s). The decision to us a multi-cast link or a unicast link for this connection point is made at a higher layer, wherein the UC tunnels provide increased security, and the MC tree provides efficiency.

According to an exemplary embodiment, the CS 326 transmits data to the PDSN 320 via a multi-cast IP address, wherein the PDSN 320 further transmits data to the PCF 310 and the PCF/BSC 312 also via a multi-cast IP address. The PCF 310, for example, then determines the number of individual users in the active set that are in the destination subscription group and duplicates the frame received from the CS 326 for each of those users. The PDSN PCF 310 determines the BSC(s) corresponding to each of the users in the subscription group.

In one embodiment, the BSC 304 is adapted to transmit to proximate BSC(s), wherein the BSC 304 may duplicate the received packets and send them to one or more of the neighboring BSC(s). The chaining of BSCs yields better soft handoff performance. The "anchoring" BSC method yields better soft handoff performance. The anchoring BSC 304 duplicates the transmission frame and sends it with the same time-stamp to its neighboring BSCs. The time-stamp information is critical to the soft handoff operation as the mobile station receives transmission frames from different BSCs.

Multi-cast Service

One type of broadcast service is referred to as Multi-cast (MC) service or "Group Call (GC)" wherein a "GC group" includes those users that will be participants in the GC, wherein a group of users is identified for a given MC content. The group of users may be referred to as a MC group. The MC content is intended only for the MC group members. Each active user in the MC group registers with the AN. The AN then tracks the location of each registered user, and targets transmission of the MC message to these locations. Specifically, the AN determines a cell, sector, and/or geographical area within which each of the users of the MC group is located, and then transmits the message to PCFs associated with those cells, sectors, and/or geographic areas.

As opposed to some other type broadcast services wherein the BC message is transmitted without knowledge of the location and activity of the recipients or subscribers, the MC service operates using knowledge of the active users, specifically the location of each active user. Additionally, the users provide location information to the AN. In one embodiment the active users in an MC group register with the AN via IP communications, specifically by using an Internet Group Management Protocol (IGMP) message. As the MC service is able to identify the location of each user, and the MC targets transmission to those locations, the MC service utilizes a router between the PCF(s) and the PDSN (s). The MC service builds a tree of connections that provide a path from the CS to each PCF that is communicating with an active user in the MC group. The tree is referred to as an MC tree.

In a conventional IP network or system, such as a computer network coupled to the Internet, if a user desires to receive MC type information, referred to as the MC content, the user registers with the nearest router using the Internet Group Management Protocol (IGMP). The router then begins the process of building a MC tree by registering with the next adjacent router. The CS then sends MC content in the form of a MC IP packet. The MC IP packet is then routed through the MC tree to the original router. This router duplicates the data for each user desiring the MC content. A common broadcast media in a computer network is an Ethernet hub that connects multiple users to a same information stream.

The combination of the Internet and IP networks with wireless communication systems introduces several distinct problems. One problem is routing the information from the IP network through the wireless network. Several of the interconnections are predefined in a wireless system. For example, as discussed hereinabove, the interface between the BSC and PCF is defined by the A8/A9 connection. Similarly, the PCF to PDSN connection is defined by the A10/A11 connection. One embodiment forms an internal MC tree between the PDSN and PCF, and forms an external MC tree between the PDSN and the CS. The PCF then forms specific tunnels to the various BSCs that request the MC content. This embodiment, discussed hereinbelow, provides efficiency of operation. Another embodiment forms the external MC tree between the PDSN and the CS, while setting up tunnels from the PDSN to each individual PCF that is to receive the MC content. This embodiment provides secure communications.

Generally, the MC path is considered end-to-end, wherein the MC content originates at a source and is transmitted to the end user. The end user may be MS. Alternatively, the MS may be a mobile router that routes the MC content to a network. The end user does not forward the MC content. Note that a MC path may include a plurality of different types of interconnects. For example, one embodiment may incorporate the internal MC tree discussed hereinabove having a termination point at the PCF, and the external MC tree having a termination point at the PDSN. Similarly, the MC path may include point-to-point tunnels, wherein each tunnel is formed between one node and a distinct individual node.

According to an exemplary embodiment illustrated in FIG. 5, a communication system 300 includes a CS 326 in communication with PDSNs 320 and 322 via an IP cloud 324. Note that CS 326 also communicates with other PDSNs not shown. The IP cloud 324 includes a configuration of routers, such as multi-cast routers (as described hereinabove) and other routers for passing data transmissions through the cloud 324. Transmissions through the IP cloud 324 are IP communications. The routers within the IP cloud 324 accesses communications, such as BC messages and MC messages, to target recipients consistent with the Internet Engineering Task Force (IETF) protocols.

Continuing with FIG. 5, the PDSN 320 and 322 are in communication with PCFs 310 and 312, as well as other PCFs not shown, via another IP cloud 314. The IP cloud 314 includes a configuration of routers, such as multi-cast routers and other routers for passing data transmissions through the cloud 314. Transmissions through the IP cloud 314 are IP communications. The routers within the IP cloud 314 accesses communications, such as BC messages and MC messages, to target recipients consistent with the Internet Engineering Task Force (IETF) protocols. Further, the PCF 310 communicates with the BSC 304 via still another IP cloud 308. The IP cloud 314 includes a configuration of routers, such as Multi-cast routers and other routers for passing data transmissions through the cloud 314. Transmissions through the IP cloud 314 are IP communications. The PCF 312 also operates as a BSC and is in communication with any of the users within system 300 (not shown). Note that for clarity three BSCs are illustrated, specifically, BSCs 302, 304 and 306. The system 300 may include any number of additional BSC (not shown). Note that alternate embodiments may incorporate alternate configurations, wherein any or connections indicated by the multiple IP clouds, such as IP clouds 308, 314, 324, may be replaced with point-to-point connections. A point-to-point connection may be a secure connection made between the apparatus at one point, such as at a PCF, to another point, such as a BSC. The point-to-point connection is achieved over an IP cloud, such as IP cloud 308, using the method called tunneling. The basic idea of tunneling to take an IP packet, encapsulate the packet in GRE/IP and send the resultant packet to a destination point. If the destination address of the outer IP header is a unicast IP address, the process achieves a point-to-point tunnel. If the destination address is a multi-cast IP address, the process achieves a point-to-multipoint tunnel. Note that all this is done in the same IP cloud. For example, in IP cloud 314, there are several different applicable methods. One method forms a point-to-point tunnel, and a second method forms a point-to-multipoint tunnel. This is contrasted with the connection method used in cloud 324, wherein no GRE tunneling is used and the original multi-cast IP packet is transmitted.

In the exemplary embodiment, the CS 326 configures an HSBS channel with knowledge of a multi-cast IP address to be used in the IP cloud 324. The CS uses the MC IP address to send the HSBS content information, referred to as the payload.

To form a tunnel, the message is encapsulated within an external IP packet. As the encapsulated message transmits through the tunnel, the internal IP address, i.e., IP address of the original IP packet, is ignored. The encapsulation changes the Internet routing of the original IP packet. In the exemplary embodiment, the MC tunnel routes the BC or MC message through the MC tree between PDSN and PCF.

In the exemplary embodiment, the PDSN 320 and the PCFs 310 and 312 are associated with an MC group. In other words, MC group members are located within cells, sectors, and/or geographical areas serviced by the PCFs 310 and 312. The system 300 builds an external MC tree from the CS 326 to the PDSN 320 and an internal tree from the PDSN 320 to PCFs 310 and 312. The PDSN 320 builds the external MC tree by successively registering with neighboring Multi-cast routers within the IP cloud 324. The external MC tree is built from the PDSN 320 to the CS 326 through the IP network. The PDSN 320 receives the MC message(s) for MC group members via the external MC tree. In other words, MC messages are sent through the external MC tunnel structured by the external MC tree. Each of the PCFs 310 and 312 builds an internal MC tree to the PDSN 320 through the IP cloud 314. The MC message(s) from the PDSN 320 are sent over an internal MC tree in a GRE/IP tunnel.

Alternate embodiments may apply the methods discussed hereinabove to alternate BC services, wherein a point-to-multipoint transmission is used. The use of MC trees formed by the leaves or termination points registering with successive routers provides a convenient and dynamic method of avoiding redundancies in the communication system. Additionally, the use of MC trees provides increased scalability reducing the amount of infrastructure required for expanding the network.

Selection of a PDSN

A Packet Control Functions (PCF) and a Packet Data Serving Node (PDSN) are network entities defined in a cdma2000 access network, and are adapted for supporting multi-cast/broadcast services. Generally, a PCF may be able to establish communications with multiple PDSNs. In turn, a PDSN may be able to establish communications with multiple PCFs. The transport path of the data traffic for a given communication is referred to as the "bearer transport". The bearer transport for a multi-cast/broadcast service in the forward direction normally flows through a PDSN, PCF, and base station, before being received by the mobile stations subscribed to that multi-cast/broadcast service. In order to save transmission resources, the mobile stations tune to a shared radio channel for the multi-cast/broadcast service. The network uses an Internet Protocol (IP) to send the messages to the PCFs, wherein in one embodiment a multi-cast/broadcast service is identified by a 32-bit IP multi-cast address.

When more than one mobile station, served by a given PCF, want to receive a multi-cast/broadcast service identified by an IP multi-cast address X, the PCF needs to establish a bearer path with a PDSN for transporting the multi-cast/broadcast service. Since multiple PDSNs may establish a connection with the PCF, the PCF needs to select one PDSN to provide the bearer transport.

According to one embodiment, a method automatically selects a PDSN for a multi-cast/broadcast message, wherein the message is identified by the IP multi-cast address X. The method effectively performs balances loading on the multiple PDSNs. In other words, if a given PCF is able to communicate with N PDSNs and there are M multi-cast/broadcast messages or services that need to go through that PCF, by using method of the present embodiment, each PDSN on average will handle M/N multi-cast/broadcast services.

Figure 6:
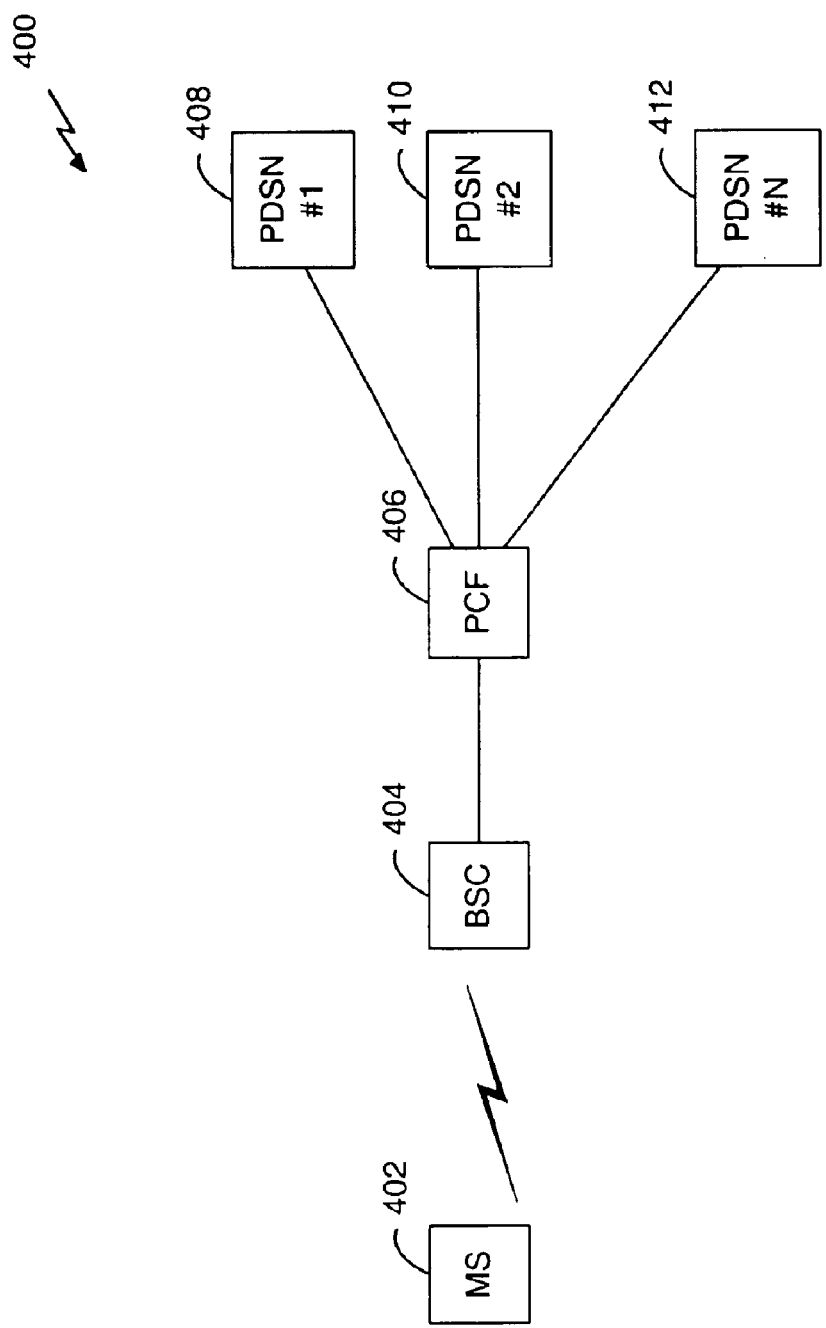
FIG. 6 is a wireless communication system having multiple PDSNs communicable with a given PCF.

FIG. 6 illustrates a communication system 400 having an MS 402 in communication with a BSC 404 via radio transmissions, i.e., air interface. Note that alternate embodiments may include any number of other controllers or transmitters coupled between the MS 402 and the BSC 404. As illustrated in FIG. 6, BSC 404 is in communication with PCF 406, which in turn may be in communication with any of PDSNs 408, 410, and/or 412. As discussed hereinabove, a decision is made to select a PDSN of those available for a given communication through the PCF 406. The decision is made according to criteria specific to the system 400.

According to the exemplary embodiment, the system 400 assigns each PDSN an identifier, such as an integer number. As illustrates in FIG. 6, the PDSNs 408, 410, 412 are assigned identifiers 1, 2, and 3, respectively. The system 400 selects a PDSN for a given communication by application of the following formula:

$$L=(Y) \text{ modulo } N \qquad (1)$$

wherein L corresponds to the PDSN identifier, and N is the total number of PDSNs reachable by, i.e., able to communicate with, the PCF 406. Note that in the exemplary embodiment the PCF 406 makes the selection of a PDSN according to Equ. (1), wherein the PCF internally associates each reachable PDSN with a number ranging from 0 to N-1. The variable Y is a function of a multi-cast address X associated with the communication. Specifically, the variable Y is defined in terms of the address generally as:

$$Y = f(X). \qquad (2)$$

In the exemplary embodiment, the multi-cast address X is a 32-bit IP multi-cast address that identifies a multi-cast/broadcast service. Alternate embodiments may apply other addressing schemes. The system obtains the multi-cast address X from a setup message sent by the BSC 404. Specifically, reception of the setup message triggers the PCF 406 to perform the PDSN selection for the multi-cast/broadcast service.

In the exemplary embodiment, the IP multi-cast address X may be represented by a binary representation given as:

$$1110 x_{27} x_{26} x_{25} x_{24} \, x_{23} x_{22} x_{21} x_{20} x_{19} x_{18} x_{17} x_{16}$$
$$x_{15} x_{14} x_{13} x_{12} x_{11} x_{10} x_9 x_8 \, x_7 x_6 x_5 x_4 x_3 x_2 x_1 x_0 \qquad (3)$$

wherein $x_i$ is either 0 or 1 for $i=0, 1, \ldots, 27$.

As given in Equ. (2), Y is a function of X, wherein the function f( ) is a mathematical function that converts the multi-cast address into an integer value. As an example, one straight-forward function converts the IP multi-cast address into an integer representation by the following equation:

$$Y = 2^{31} + 2^{30} + 2^{29} + (x_{27})(2^{27}) + (x_{26})(2^{26}) + \ldots + (x_0)(2^0) \qquad (4)$$

An alternate example is generated by simplifying the function of Equ. (4), (specifically by removing the first three constant terms) and is given as:

$$Y = (x_{27})(2^{27}) + (x_{26})(2^{26}) + \ldots + (x_0)(2^0) \qquad (5)$$

In the exemplary embodiment, L is the outcome of the modulo N operation performed on Y. Specifically, L is the remainder of the operation of Y divided by N. The value of L ranges between 0 and N-1. For example, if Y=131 and N=7, then L=5. Therefore, PCF 406 will select the PDSN identified by 5. The method allows for dynamic transmission path selection avoiding human intervention.

Figure 7:
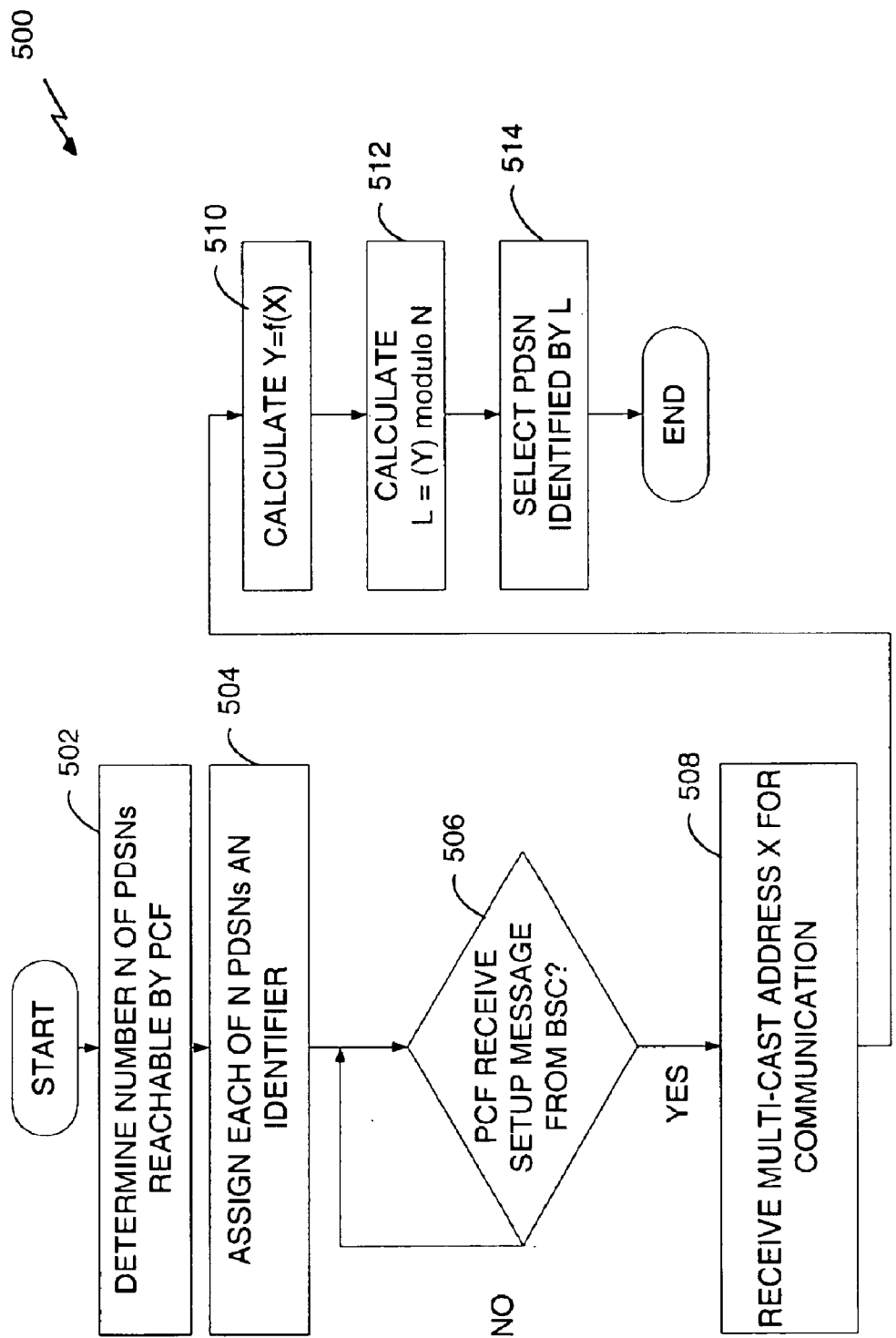
FIG. 7 is a flow diagram for selecting one of multiple PDSNs communicable with a given PCF.

FIG. 7 illustrates a method 500 for selecting a PDSN. At step 502 the PCF determines the number N of reachable PDSNs. The PCF then assigns each of the reachable PDSNs a unique identifier at step 504. When the PCF receives a setup message for a given communication, at decision diamond 506, the PCF proceeds to step 508 to receive the multi-cast address X for the given communication. The PCF then calculates Y as a function of the multi-cast address X at step 510. At step 512 the PCF determines a value L according to Equ. (1), and determines the corresponding PDSN at step 514. The selected PDSN is then used for the given communication. The transmission path from content server to end user may be set up in a variety of methods, such the IP methods discussed hereinabove.

The method 500 of FIG. 7 determines the PDSN as a function of the multi-cast address and effectively results in an average probability for selecting any one of the reachable PDSNs, as the probability of selecting any one of the PDSN is 1/N, as the modulo-N operation on the integer value of a multi-cast address is uniformly distributed between 0 and N-1. The multi-cast traffics are therefore uniformly balanced among the N PDSNs.

The present invention is applicable to a point-to-multipoint transmission service, such as broadcast, as well as a One-to-Many type service, such as multi-cast. Alternate embodiments may implement the PDSN selection method at an alternate infrastructure element. The method illustrated in FIG. 7 may be extended for selection of any portion of a transmission path, wherein multiple connections are possible but only one will be used for the transmission. The use of a multi-cast address, or other type of address, associated with a given communication, the selection process balances the potential connections, and provides equal probability of selecting any one. Additionally, while the calculation of L as given in Equ. (1) provides a straightforward calculation, alternate functions may be implemented to determine the value of L.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system supporting broadcast transmissions, the system having a protocol control function node and a plurality of packet data service nodes, a method for setting up transmission paths comprising:
    determining a first number of the plurality of packet data service nodes communicable with the protocol control function node; and
    determining a first packet data service node for a first communication as a function of the first number, wherein the determined first packet data service node supports the transmission paths for all mobile stations which are to receive a first broadcast transmission through the protocol control function node.

2. The method as in claim 1, wherein determining the first packet data service node comprises:
    assigning a unique identifier to each packet data service node communicable with the protocol control function node.

3. The method as in claim 2, wherein determining the first packet data service node further comprises:
    receiving a multi-cast address for the first communication; and
    determining the first packet data service node as a function of the multi-cast address.

4. The method as in claim 3, wherein determining the first packet data service node as a function of the multi-cast address comprises:
    performing a modulo operation on the multi-cast address and the first number, wherein the result of the modulo operation corresponds to one of the unique identifiers assigned to reachable packet data service nodes.

5. The method of claim 3, wherein the multi-cast address is an Internet Protocol address.

6. In a wireless communication system supporting broadcast transmissions, the system having a protocol control function node and a plurality of packet data service nodes, a method for setting up transmission paths comprising:
    determining a multi-cast address of a first communication; and
    determining a first packet data service node for the first communication as a function of the multi-cast address, wherein the determined first packet data service node supports the transmission paths for mobile stations which are to receive a first broadcast transmission through a protocol control function node.

7. The method as in claim 6, further comprising:
    determining a first number of the plurality of packet data service nodes communicable with the protocol control function no.

8. The method as in claim 7, wherein determining a first packet data service node for the first communication as a function of the multi-cast address comprises:
    performing a modulo operation on the multi-cast address and the first number, wherein the result of the modulo operation corresponds to one of the unique identifiers assigned to reachable packet data service nodes.

9. An infrastructure element for setting up transmission paths in a wireless transmission system supporting broadcast transmissions, the infrastructure element comprising:
    means for determining a first number of the plurality of packet data service nodes communicable with the protocol control function node; and
    means for determining a first packet data service node for a first communication as a function of the first number, wherein the determined first packet data service node supports the transmission paths for all mobile stations which are to receive a first broadcast transmission through the protocol control function node.

10. An infrastructure element for setting up transmission paths in a wireless transmission system supporting broadcast transmissions, the infrastructure element comprising:
    means for determining a multi-cast address of a first communication; and
    means for determining a first packet data service node for the first communication as a function of the multi-cast address, wherein the determined first racket data service node supports the transmission paths for mobile stations which are to receive a first broadcast transmission through a protocol control function node.

11. A wireless communication system supporting broadcast transmissions, the system having a protocol control function node and a plurality of packet data service nodes, a method for setting up transmission paths comprising:
    means for determining a first number of the plurality of packet data service nodes communicable with the protocol control function node; and
    means for determining a first packet data service node for a first communication as a function of the first number, wherein the determined first packet data service node supports the transmission paths for all mobile stations which are to receive a first broadcast transmission through the protocol control function node.

12. A wireless communication system supporting broadcast transmissions, the system having a protocol control function node and a plurality of packet data service nodes, a method for setting up transmission paths comprising:
    means for determining a multi-cast address of a first communication; and
    means for determining a first packet data service node for the first communication as a function of the multi-cast address, wherein the determined first packet data service node supports the transmission paths for mobile stations which are to receive a first broadcast transmission through the protocol control function node.

13. The method as in claim 2, wherein determining the first packet data service node further comprises:
    receiving a parameter indicating a multi-cast address for the first communication; and
    determining the first packet data service node as a function of the parameter.

14. The method as in claim 13, wherein determining the first packet data service node as a function of the multi-cast address comprises:

performing a modulo operation on the parameter and the first number, wherein the result of the modulo operation corresponds to one of the unique identifiers assigned to reachable packet data service nodes.

15. An infrastructure element for setting up transmission paths in a wireless transmission system supporting broadcast transmissions, the infrastructure element comprising:

a memory storage device adapted for storing computer-readable instructions; and a processor adapted for processing the computer-readable instructions to:

determine a first number of the plurality of packet data service nodes communicable with the protocol control function node; and determine a first packet data service node for a first communication as a function of the first number, wherein the determined first packet data service node supports the transmission paths for all mobile stations which are to receive a first broadcast transmission through the protocol control function node.

16. An infrastructure element for setting up transmission paths in a wireless transmission system supporting broadcast transmissions, the infrastructure element comprising:

a memory storage device adapted for storing computer-readable instructions; and a processor adapted for processing the computer-readable instructions to:

determine a multi-cast address of a first communication; and determine a first packet data service node for the first communication as a function of the multi-cast address, wherein the determined first racket data service node supports the transmission oaths for mobile stations which are to receive a first broadcast transmission through the protocol control function node.

* * * * *